US012668721B2

(12) United States Patent
Schleinitz

(10) Patent No.: US 12,668,721 B2
(45) Date of Patent: Jun. 30, 2026

(54) FRICTION FILM

(71) Applicant: AKTIEBOLAGET SKF, Gothenburg (SE)

(72) Inventor: Thilo von Schleinitz, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 721 days.

(21) Appl. No.: 17/770,178

(22) PCT Filed: Nov. 9, 2020

(86) PCT No.: PCT/EP2020/081489
§ 371 (c)(1),
(2) Date: Apr. 19, 2022

(87) PCT Pub. No.: WO2021/094253
PCT Pub. Date: May 20, 2021

(65) Prior Publication Data
US 2022/0298387 A1 Sep. 22, 2022

(30) Foreign Application Priority Data
Nov. 11, 2019 (DE) .......................... 102019217388.8

(51) Int. Cl.
*C09J 7/26* (2018.01)
*C09J 5/00* (2006.01)
(Continued)

(52) U.S. Cl.
CPC . *C09J 7/26* (2018.01); *C09J 5/00* (2013.01); *C09J 7/21* (2018.01); *C09J 11/04* (2013.01);
(Continued)

(58) Field of Classification Search
CPC . F16B 2/005; F16B 11/006; C09J 7/21; C09J 7/26; C09J 5/00; C09J 11/04;
(Continued)

(56) References Cited

U.S. PATENT DOCUMENTS 4,717,496 A 1/1988 Brehmer et al.
4,964,884 A * 10/1990 Jurissen ................. B24D 11/02
51/296
(Continued)

FOREIGN PATENT DOCUMENTS

CN 1303579 A 7/2001
CN 1420810 A 5/2003
(Continued)

OTHER PUBLICATIONS

Translation of WO2017129182A1 (bib, description and claims). (Year: 2017).*
(Continued)

*Primary Examiner* — Catherine A. Simone
(74) *Attorney, Agent, or Firm* — J-TEK LAW PLLC; Scott T. Wakeman; Mark A. Ussai

(57) ABSTRACT

A friction film for increasing friction between two workpieces includes a deformable carrier material having a porous structure and friction-increasing particles on at least one side of the carrier material. The carrier material may be a polyethylene film or a liquifiable adhesive, and the friction-increasing particles may be titanium boride particles and/or diamond particles.

15 Claims, 1 Drawing Sheet

(51) Int. Cl.

| | |
|---|---|
| *C09J 7/21* | (2018.01) |
| *C09J 11/04* | (2006.01) |
| *F16B 2/00* | (2006.01) |
| *F16B 11/00* | (2006.01) |

(52) U.S. Cl.
CPC ............ *F16B 2/005* (2013.01); *F16B 11/006* (2013.01); *C09J 2301/124* (2020.08); *C09J 2301/41* (2020.08); *C09J 2423/106* (2013.01)

(58) Field of Classification Search
CPC .............. C09J 2301/124; C09J 2301/41; C09J 2423/106; F16D 2200/006; F16D 2200/0069
See application file for complete search history.

(56) References Cited

U.S. PATENT DOCUMENTS

| | | | | |
|---|---|---|---|---|
| 5,702,811 | A * | 12/1997 | Ho | B24D 11/00 428/323 |
| 2004/0247808 | A1 | 12/2004 | Cooper et al. | |
| 2012/0118203 | A1 | 5/2012 | Meyer et al. | |
| 2013/0322804 | A1 * | 12/2013 | von Schleinitz | F16C 33/586 29/898.07 |
| 2015/0290771 | A1 * | 10/2015 | Li | B24D 3/06 51/297 |
| 2016/0186817 | A1 | 6/2016 | Kadin et al. | |
| 2018/0231033 | A1 | 8/2018 | Bui | |
| 2019/0011006 | A1 | 1/2019 | Dong et al. | |
| 2022/0033950 | A1 * | 2/2022 | Riemensperger | C23C 4/134 |

FOREIGN PATENT DOCUMENTS

| | | | | |
|---|---|---|---|---|
| CN | 102449343 | A | 5/2012 | |
| CN | 105492792 | A | 4/2016 | |
| CN | 107709800 | A | 2/2018 | |
| CN | 108368416 | A | 8/2018 | |
| CN | 108884891 | A | 11/2018 | |
| CN | 109530688 | A | 3/2019 | |
| DE | 4120884 | A1 | 1/1992 | |
| DE | 102009049875 | A1 | 5/2011 | |
| DE | 102015220169 | A1 | 4/2017 | |
| EP | 0183912 | A1 | 6/1986 | |
| EP | 0961038 | A1 | 12/1999 | |
| EP | 2848824 | A1 | 3/2015 | |
| WO | 2017060528 | A1 | 4/2017 | |
| WO | WO-2017129182 | A1 * | 8/2017 | .......... F16D 69/028 |

OTHER PUBLICATIONS

Office Action from the Chinese Patent Office dispatched Jan. 31, 2024 in related application No. 202080079621.7, and translation thereof.

Daniel Burtsche, "Dunne Folie sorgt für starke Leistung" Ingenieur. de, Jun. 13, 2013 (Jun. 13, 2013), pp. 1-13https://www.ingenieur. de/fachmedien/konstruktion/maschinenelemente/duenne-folie-sorgt-fuer-starke-leistung/ XP055763278.

English translation of the International Search Report of the International Searching Authority in PCT/EP2020/081489 dated May 20, 2021.

Esk Ceramics Gmbh & Co. Kg. "Reibungserhöhende Folien und Beschichtungen für Windenergie-Anwendungen" Aug. 1, 2010 (Aug. 1, 2010). pp. 1-2.https://www.yumpu.com/de/document/view/2476828/ekagripr-reibungserhohende-folien-und-esk-ceramics XP055763273.

English translation of the Written Opinion of the International Searching Authority in PCT/EP2020/081489.

* cited by examiner

FRICTION FILM

CROSS-REFERENCE

This application is the U.S. National Stage of International Application No. PCT/EP2020/081489 filed on Nov. 9, 2020, which claims priority to German patent application no. DE 10 2019 217 388.8 filed on Nov. 11, 2019.

TECHNICAL FIELD

The present disclosure is directed to a friction film for increasing the friction between two workpieces.

BACKGROUND

In various assemblies, such as, for example, in main bearings for wind turbines, it can be necessary to increase the friction between two components. Due to the increasing of the friction, the adhesion between the components can be improved. To increase the friction, it is known to apply a coating that contains friction-increasing particles. However, the use of such a friction coating leads to a longer manufacturing time since the coating must first dry before the components can be assembled. Furthermore, not every surface can be coated, which is why the use of friction coating is not possible in every case.

SUMMARY

It is therefore an aspect of the present disclosure to provide a way by which the friction between two components can be increased in a simple manner.

The friction film for increasing the friction between two workpieces includes a carrier material that is deformable. Friction-increasing particles are applied on the carrier material on at least one side. In order to make possible an adhesion of the particles on the carrier material in a simple manner, the friction-increasing particles can be applied, for example, by adhesive being applied onto the carrier material. The adhesive can also be used to affix the friction film to the workpiece and to attach it thereto.

Due to the deformable film shape, a friction-increasing layer can be attached on site between workpieces by the friction film. An additional drying step is not required. Furthermore, the friction film can be adapted on site to the size and shape of any workpiece, for example, by manual trimming.

If the friction film is placed between two workpieces, and the two workpieces are, for example screwed to each other or otherwise attached to each other, the friction film is pressed between the workpieces. The friction-increasing particles, which are preferably sharp-edged and multi-sided, interlock here with the corresponding surfaces of the workpieces and thereby increase their friction. However, due to this interlocking no permanent adhesion of the friction-increasing particles on the workpieces occurs, so that with a disassembly of the workpieces, the particles can be removed again or even simply fall off.

The workpieces can be, for example, flange connections or carriers, for example, a main bearing for a wind turbine. The workpieces can be comprised of any materials, such as, for example, metal, for example, steel, or plastic.

According to a preferred embodiment, the carrier material can be a polymer film, for example, a polyethylene film. The friction-increasing particles can be attached to this carrier material without use of a binder, such as, for example, polyurethane, for example, by extrusion molding or by adhering. In comparison to the use of a binder which, due to its brittleness, is not deformable after drying without crumbling, the friction film can therefore easily be adapted to any shapes of workpieces.

The carrier material has a porous structure. Here the carrier material can have a certain porosity and embedded or continuous pores that cause the surface of the carrier material to be very rough, whereby the friction-increasing particles can be better retained on the surface of the carrier material. Here the friction-increasing particles can partially engage in the pores, whereby the effective contact surface with the carrier material is increased compared to a carrier film without porosity.

Here the carrier material can be constructed in the form of a foamed film, preferably polymer film. Here the carrier material has a sponge-like structure including continuous pores open one side, open both sides, and/or closed pores in the interior of the film. The carrier material or the carrier film can furthermore be constructed in the form of a fiber structure of mutually interlocking or interwoven fibers, for example, in the form of a fiber fabric or fleece. A polymer material, preferably polypropylene (PP), polyethylene (PE) or polyether sulfone (PES) is also preferred here as material of the film. The porosity of the carrier material can be far over 50%, for example, in a range of 50% to 95%.

The increased compressibility with respect to a carrier film without porosity represents a further advantage of a porous carrier film. Due to the compressible pores, the compressibility and/or the fluidity is increased such that during assembling, for example, screwing or pressing of two workpieces, the carrier material is displaced and compressed into the surface irregularities and surface structures of the two workpieces such that the two workpieces are not spaced by the thickness of the carrier material in the uncompressed state, but rather by an amount significantly smaller than the thickness of the carrier material used of the film. Depending on the roughness of the surfaces to be pressed, the application of the carrier material can be approximately 0% to 30% of the thickness of the carrier material used. Furthermore, it has been confirmed that a coating with friction-increasing particles of one or both surfaces in a surface area between 10% and 30% is sufficient for a significant increase of the friction value, and simultaneously no application or spacing between the two workpieces arises, since with an equipping of only between 10% and 30% of the surface, the friction-increasing particles do not act as spacer particles, rather, in a manner corresponding to the surface structure of the workpieces, can possibly be completely pressed into the material of the workpieces, provided that in the region of the particles the two workpieces have been placed against each other directly and without spacing.

The carrier material can be a pure adhesive that is liquefiable. The adhesive can in particular be a polymer adhesive. The adhesive serves as carrier material in film form that in operation is heated after the applying of the friction film on the workpiece and then liquefied. The particles that are present on the carrier material are then present as friction-increasing particles between the workpiece and a further workpiece. In this case, for the applying onto a workpiece, friction-increasing particles are not connected to each other by a film, but rather by the adhesive itself. The particles can either already have been embedded in the plastic during manufacturing, or subsequently sprinkled-on one-side or both-sides, wherein they are either fixedly adhered or mechanically pressed-in or rolled-in. The particles can also be thermally introduced. Thus the friction-increasing particles can be heated and subsequently applied onto the carrier material, for example, sprinkled-on or blown-on. Due to their thermal energy, the particles melt fixedly in or on the carrier film. With use of a porous carrier film, the porous surface structure of the film also contributes to an improved melting behavior.

Alternatively the carrier material, i.e., the polymer film, can be coated with adhesive on both sides, wherein the friction-increasing particles are applied one-side. The friction-increasing particles can be present in powder form or as bulk material and sprinkled onto the film coated with adhesive. Due to the adhesive properties of the film, the friction-increasing particles adhere onto the adhesive surface as a one-layer coating. Due to the friction-increasing particles, the adhesive property of the film is cancelled and excess particles can simply fall off. A coating thus automatically arises having uniform and one-layer thickness. Since the other side of the carrier material is adhesive, as before, the film coated with friction-increasing particles can be adhered to a workpiece.

With a porous carrier material, this carrier material can be impregnated with adhesive. Adhesive can be applied to one or both sides of the porous carrier material, wherein due to the porous structure, at least a part of the adhesive penetrates into the pores. An adhesive surface can thus be formed without additionally increasing the thickness of the carrier film by an adhesive layer. Self-adhesive materials can also be used for the carrier film.

Alternatively both sides of the adhesive film can also be sprinkled with the friction-increasing particles. In this case the friction film is placed between two workpieces and is held between them by the assembling of the two workpieces.

With a film coated on one side with friction-increasing particles, only the non-coated side of the carrier material may also be configured as adhesive.

The film can alternatively be comprised of metal, for example, aluminum, copper, or stainless steel. Such a film can be adhered extremely thin on one side with friction-increasing particles, and the particles that are significantly larger than the film thickness could, under pressure, initially press through the film and then interlock on both sides. Alternatively the metal film can be coated on both sides with friction-increasing particles.

According to a further embodiment, the carrier material has a thickness of 20 μm to 100 μm, in particular 25 μm to 50 μm. Here the carrier material is configured in particular thinner than the friction-increasing particles, which can have, for example, a longitudinal extension of 100 μm to 150 μm. According to a further preferred embodiment, the carrier material is configured porous, and has a thickness of 10 μm to 100 μm, in particular 15 μm to 30 μm. Due to the high compressibility of the porous carrier material, in the installed state the carrier material is then also significantly thinner than the friction-increasing particles are when they are approximately the same size as, or even smaller than, the original thickness of the carrier material. With a porous carrier material having a thickness of 15 μm to 50 μm, the particles can have a longitudinal extension of 10 μm to 150 μm.

If the friction film is placed between two workpieces, the friction film is pressed between the workpieces, and here the friction-increasing particles are pressed through the film. Since the carrier material is configured thinner than the friction-increasing particles, the particles can thus press through the carrier material such that the friction-increasing particles come in contact with both workpieces. A one-side coating of the carrier material with the friction-increasing particles is therefore also sufficient.

With respect to the friction-value increase, the carrier material only serves the purpose of fixing the friction-increasing particles and bringing them into a useful distribution and position between the two surfaces to be assembled. As soon as the installation has occurred, the carrier material has no further function, unless a gap-sealing against corrosive influences would be desired. The temperature resistance of the carrier material is far lower than that of the friction-increasing particles. The particles are very highly temperature resistant. The limit of the thermal loadability of the mechanical connection thus lies at the level of the loadability of the mostly metallic workpieces that are connected to each other, and is not limited by the friction-increasing film. A thermal damage or degradation of the carrier material does not lead to functional or friction loss of the already assembled connection.

Titanium diboride particles and/or diamond particles can preferably be used as friction-increasing particles. Other materials that are suitable for increasing the friction can also be used. The particles used should have a low tendency to splinter, in order, to the extent possible, not to break down into smaller pieces under load. Titanium diboride or diamond are particularly suitable. Very hard grinding grains such as boron nitride CBN, or also, with limitation, silicon carbide are suitable. Depending on the hardness of the workpieces to be connected, classical grinding grains such as corundum or white corundum are also suitable.

According to a further embodiment, spacer particles can be applied to the carrier material in addition to the friction-increasing particles. These spacer particles can exercise a double function, namely the increasing of the friction as well as the ensuring of the spacing between the workpieces.

The spacer particles can be, for example, zinc particles. These can deform somewhat under pressure without penetrating into the surface of the carrier material. As soon as the flat-pressed surfaces of the zinc particles have achieved a total surface area by which the load in N/mm2 no longer allows flowing, they serve as stable spacers.

Alternatively a fine-grain proportion of the friction-increasing particles can be used as spacer particles. Here the grain distribution of the friction-increasing particles, for example, titanium diboride or another hard material, is used that can contain both coarse grains and fine grains. A defined amount of large grains first presses into the surfaces of the workpieces. However, as soon as a large amount of fine grain also comes into abutment, the pressing force per surface unit decreases; the fine grain thus cannot be pressed into the surfaces, and acts as spacers.

Further advantages and advantageous embodiments are specified in the description, the drawings, and the claims. Here in particular the combinations of features specified in the description and in the drawings are purely exemplary, so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

5

Figure 1:
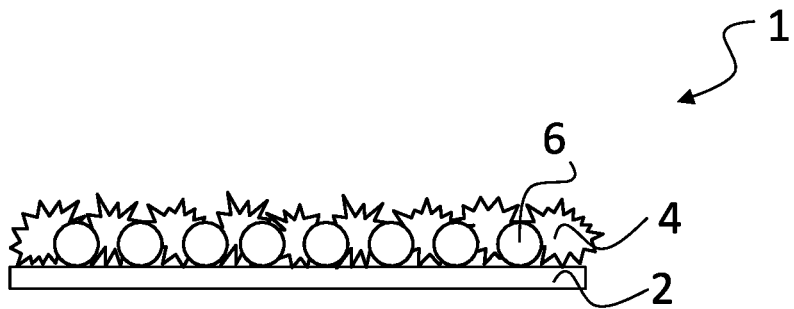
FIG. 1 shows a friction film according to an embodiment of the invention.
Figure 2:
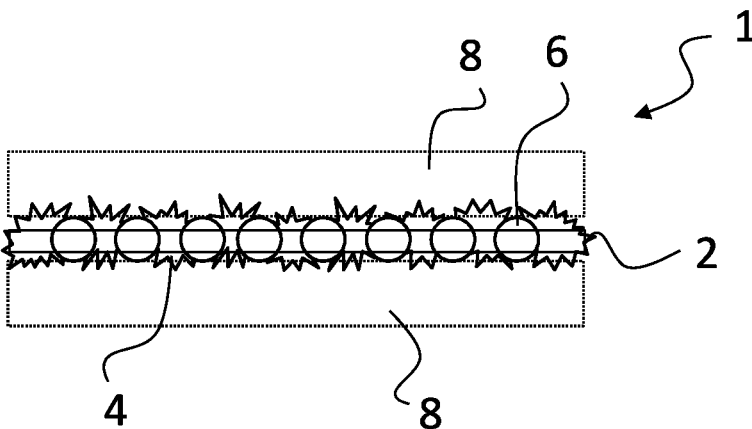

FIG. 2 shows the friction film of FIG. 1 disposed between two workpieces.

DETAILED DESCRIPTION

In the following, identical or functionally equivalent elements are designated by the same reference numbers.

FIG. 1 shows a friction film 1 for increasing the friction of a workpiece. The friction film 1 includes a carrier material 2. The carrier material 2 can be, for example, a film that is coated with an adhesive. In one not-depicted embodiment, the carrier material can be an adhesive that serves only as carrier for the assembling, and liquefies in operation. The following description relates to the design as a film, but can be used analogously with respect to the design as pure adhesive.

The film can be, for example, a polymer film on which an adhesive is applied on both sides. As is shown in FIG. 1, the carrier material 2 is coated only on one side with friction-increasing particles 4. Alternatively (not shown), the carrier material 2 can also be coated on both sides with friction-increasing particles 4. If the carrier material 2 is only coated on one side, the other side can be adhesive. In this way the friction film 1 can be applied to a workpiece in a simple manner, since it can be adhered to the workpiece by the adhesive side. The friction film 1 can easily be adapted to the shape of the workpiece by it being trimmed, for example, manually on site, without additional (punching) tools. Furthermore, the friction film 1 is deformable (without a crumbling of the particles 4), and can therefore also be adapted to curves or the like of the workpiece.

The friction-increasing particles 4 serve to increase the friction of the workpiece, and can be, for example, titanium diboride particles or diamond particles. In addition to the friction-increasing particles 4, still further particles 6 can be applied to the carrier material 2, such as, for example, spacer particles. Due to the spacer particles 6, it can be ensured that the friction-increasing particles 4 can only embed into a workpiece by up to a predefined degree, as is described in connection with FIG. 2.

The friction-increasing particles 4 and the spacer particles 6 adhere to the carrier material 2 due to the adhesive properties of the carrier material 2. For example, the friction-increasing particles 4 and the spacer particles 6 can be sprinkled onto the carrier material 2 in powder form or as bulk material, wherein excess particles fall off. In this way a uniform and one-layer coating including friction-increasing particles 4 and spacer particles 6 is created.

If the friction film 1 is now inserted between two workpieces 8, as is shown in FIG. 2, the friction-increasing particles 4 press into the surfaces of the workpieces 8. Here the friction-increasing particles 4 press on the one hand through the film, and on the other hand the friction-increasing particles 4 interlock with the surfaces of the workpieces 8.

If the friction film 1 is removed again, the friction-increasing particles 4 are thus also removed, since they do not adhere to the workpieces 8, but rather only an interlocking takes place to increase the friction. As can be seen in FIG. 2, the friction-increasing particles 4 press only as far into the surfaces of the workpieces 8 as the spacer particles 6 allow. The spacer particles 6, for example zinc particles, can deform somewhat under pressure without penetrating into the surface of the carrier material 2. As soon as the flat-pressed surfaces of the spacer particles 6 have achieved a total surface area by which the load in N/mm2 no longer allows flowing, they serve as stable spacers.

Due to the friction film described here, it is thus possible in a simple manner to increase the friction between two workpieces. Since the friction-increasing particles are present in film form, these can easily be applied to a workpiece and be adapted to the shape and size of the workpiece on site.

The invention claimed is:

1. A friction film configured to increase friction between two workpieces when compressed between the two workpieces,
   wherein the friction film includes a deformable foamed polymer film having a porosity of 50% to 95% as a carrier material and friction-increasing particles on at least one side of the friction film,
   wherein zinc particles are provided on the carrier material, and
   wherein particles of a first set of the zinc particles maintain a separation between pairs of the friction-increasing particles.

2. The friction film according to claim 1, wherein the foamed polymer film comprises polypropylene or polyether sulfone.

3. The friction film according to claim 1, wherein the carrier material is coated with an adhesive on both sides, and wherein the friction-increasing particles are applied to only one side of the carrier material.

4. The friction film according to claim 1, wherein the carrier material is coated with an adhesive on both sides, and wherein the friction-increasing particles are applied on both sides of the carrier material.

5. The friction film according to claim 1, wherein the friction-increasing particles are embedded in the carrier material.

6. The friction film according to claim 1, wherein the carrier material has a thickness of 20 μm to 100 μm.

7. The friction film according to claim 6, wherein the friction-increasing particles are applied to only one side of the carrier material.

8. The friction film according to claim 1, wherein the friction-increasing particles include titanium boride particles and/or diamond particles.

9. The friction film according to claim 1,
   wherein the friction-increasing particles are attached to the carrier material by an adhesive.

10. The friction film according to claim 1,
   wherein the foamed polymer film is a foamed polyethylene film.

11. The friction film according claim 1, wherein the carrier material has a thickness of 25 μm to 50 μm.

12. The friction film according claim 1, wherein the carrier material has a thickness of 15 μm to 50 μm.

13. A system comprising
   a first workpiece;
   a second workpiece; and
   a friction film between the first workpiece and the second workpiece,
   wherein the friction film includes a deformable carrier material having a porous structure and friction-increasing particles on at least one side,
   wherein in addition to the friction-increasing particles, zinc particles are applied to the carrier material as spacer particles,
   wherein particles of a first set of the zinc particles maintain a separation between pairs of the friction-increasing particles, and
   wherein the first workpiece is connected to the second workpiece in a manner that presses the friction-increasing particles into a surface of the first workpiece and into a surface of the second workpiece.

14. A system comprising a first workpiece;

a second workpiece; and the friction film according to claim 1 between the first workpiece and the second workpiece, wherein the first workpiece is connected to the second workpiece in a manner that presses the friction-increasing particles into a surface of the first workpiece and into a surface of the second workpiece.

15. The system according to claim 13, wherein the carrier material comprises polyethylene film, wherein the carrier material is coated with adhesive on both sides, wherein the carrier material has a thickness of 25 μm to 50 μm, and wherein the friction-increasing particles include titanium boride particles and/or diamond particles.

* * * * *